US012092089B2

(12) United States Patent
May

(10) Patent No.: US 12,092,089 B2
(45) Date of Patent: Sep. 17, 2024

(54) FLUID PUMP HAVING ACTUATORS INCLUDING MOVABLE ELEMENTS FOR PUMPING FLUID IN A PUMPING DIRECTION

(71) Applicant: TOMORROW'S MOTION GMBH, Berg (DE)

(72) Inventor: Lutz May, Berg (DE)

(73) Assignee: TOMORROW'S MOTION GMBH, Starnberg (DE)

( * ) Notice: Subject to any disclaimer, the term of this patent is extended or adjusted under 35 U.S.C. 154(b) by 379 days.

(21) Appl. No.: 17/594,020

(22) PCT Filed: Apr. 3, 2020

(86) PCT No.: PCT/EP2020/059540
§ 371 (c)(1),
(2) Date: Sep. 30, 2021

(87) PCT Pub. No.: WO2020/201500
PCT Pub. Date: Oct. 8, 2020

(65) Prior Publication Data

US 2022/0154734 A1 May 19, 2022

(30) Foreign Application Priority Data

Apr. 4, 2019 (EP) .................................... 19167322

(51) Int. Cl.
*F04B 17/00* (2006.01)
*F04B 43/04* (2006.01)
*F04F 7/00* (2006.01)
*H04R 17/00* (2006.01)
*F04B 19/20* (2006.01)
(Continued)

(52) U.S. Cl.
CPC .......... *F04B 17/003* (2013.01); *F04B 43/046* (2013.01); *F04F 7/00* (2013.01); *H04R 17/00* (2013.01); *F04B 19/20* (2013.01); *F04B 35/04* (2013.01); *F04B 43/0045* (2013.01)

(58) Field of Classification Search
CPC .......... F04B 17/003; F04B 1/34; F04B 19/20; F04B 43/0009; F04B 43/0045; F04F 99/00
See application file for complete search history.

(56) References Cited

U.S. PATENT DOCUMENTS

| | | | | |
|---|---|---|---|---|
| 5,816,780 A * | 10/1998 | Bishop | F04B 43/14 417/322 |
| 6,450,773 B1 * | 9/2002 | Upton | F04B 17/003 417/478 |

(Continued)

FOREIGN PATENT DOCUMENTS

| | | |
|---|---|---|
| JP | S6357900 | 3/1988 |
| SU | 588398 | 1/1978 |

(Continued)

*Primary Examiner* — Nathan C Zollinger
*Assistant Examiner* — Timothy P Solak
(74) *Attorney, Agent, or Firm* — Fay Kaplun & Marcin, LLP

(57) ABSTRACT

A fluid pump for pumping fluids using actuators, like loudspeakers or piezoelectric elements that are arranged in a fluid chamber side by side to each other to generate a fluid flow by driving the actuators with phase shifted signals, so that fluid is sucked into an inlet end of the fluid chamber and pushed out of an outlet end of the fluid chamber.

19 Claims, 6 Drawing Sheets

(51) Int. Cl.
*F04B 35/04* (2006.01)
*F04B 43/00* (2006.01)

(56) References Cited

U.S. PATENT DOCUMENTS

| | | | | |
|---|---|---|---|---|
| 7,889,877 | B2 * | 2/2011 | Lutz | F04B 43/12 381/191 |
| 8,235,934 | B2 * | 8/2012 | Tsuchiya | A61B 5/150083 422/549 |
| 2004/0086400 | A1 | 5/2004 | Blakley | |
| 2005/0106064 | A1 | 5/2005 | Laurell et al. | |
| 2011/0176935 | A1 * | 7/2011 | Kooijman | F04F 5/16 417/54 |
| 2014/0161628 | A1 | 6/2014 | Banister | |
| 2015/0322932 | A1 * | 11/2015 | Kosa | F04B 43/14 417/413.2 |

FOREIGN PATENT DOCUMENTS

| | | |
|---|---|---|
| SU | 663891 | 5/1979 |
| WO | 2011/065356 A1 | 6/2011 |

* cited by examiner

FLUID PUMP HAVING ACTUATORS INCLUDING MOVABLE ELEMENTS FOR PUMPING FLUID IN A PUMPING DIRECTION

TECHNICAL FIELD

The description relates to a fluid pump for pumping fluids and to a use of such a fluid pump. The description especially relates to a fluid pump that implements acoustic principles and makes use of acoustic mechanisms to pump a fluid in a desired direction.

BACKGROUND

When moving or pumping agile substances, especially fluids like gases or liquids, with different viscosities and at different pressure, a number of different physical solutions have been developed in the past. Some of the well-known and established pumping principles are piston operated pumps, gearwheel pumps, centrifugal force related pumps, and propeller-based pumping systems, only to mention a few of them.

What most of these pumping systems have in common is that there are moving parts that have some wear-and-tear, are relatively large and somewhat complex, and in most cases require precision tooling, typically with very strict requirements in regards of tolerances of the components, especially of moving components. The applied mechanical tolerances decide about the system efficiency and how reliable the pumping mechanism may be over time.

BRIEF SUMMARY

In consideration of the existing pumping principles, it may be regarded an object to provide a pumping system with reduced wear and tear, particularly by reducing the number of moving parts and the friction between the parts of the pumping system.

According to an aspect, a fluid pump for pumping fluids in a desired pumping direction is provided. The fluid pump comprises a fluid chamber, a first actuator, a second actuator, and a controller. The fluid chamber is at least partially enclosed by a wall with a first opening and a second opening. The first actuator comprises a first movable element, wherein the first actuator is arranged at least partially within the fluid chamber and positioned between the first opening and the second opening. The second actuator comprises a second movable element, wherein the second actuator is arranged at least partially within the fluid chamber and positioned between the first opening and the second opening. The controller is configured to control a state of the first actuator and the second actuator. The first actuator and the second actuator are offset with respect to one another in a flow direction of the fluid from the first opening to the second opening. The controller is configured to drive the first and second actuator so that a relative position of the respective movable element is determined. The controller is configured to control, at a first time t1, the first movable element to move from an initial position to an at least partially extracted position towards the wall of the fluid chamber and thereby pushing aside the fluid within the fluid chamber, and the controller is configured to control, at a second time t2, the second movable element to move from an initial position to an at least partially extracted position towards the wall of the fluid chamber and thereby pushing aside the fluid within the fluid chamber.

The first movable element moves within the fluid chamber and varies the volume of the fluid chamber between the first and second opening while moving. The same applies to the second movable element. While the first actuator and the second actuator do not necessarily need to be arranged in the fluid chamber in their entirety, at least the movable elements of the actuators are located so that they can move (e.g., be extracted from an initial position to a maximum extracted position or somewhere in between the initial position and the maximum extracted position and partially or entirely retracted from a partially or maximum extracted position towards the initial position) within the fluid chamber and vary the volume of the fluid chamber and/or the cross section of the fluid chamber at the position where the actuator is positioned, thereby causing fluid displacement and directing fluid to the first and/or second opening of the fluid chamber.

While movement of a single movable element within the fluid chamber may not be able to pump fluid in a continuous flow in a desired direction, this can be achieved with two or more actuators. With a single movable element, the fluid displacement cannot be directed in a desired direction as the fluid displacement occurs towards both, the first and second opening. The first movable element moves from a retracted position into an extracted position (partially or entirely extracted) and holds this position at least temporarily, so that the cross section of the fluid chamber is reduced at a particular position where the first movable element is arranged. This reduction of the size of the cross section causes an increased resistance to a fluid flow when passing the first movable element. Now, when the second movable element moves from its refracted position into an extracted position (partially or entirely extracted), the fluid displacement caused by the second movable element is at least partially blocked by the extracted first movable element and the majority of the fluid displacement caused by the second movable element is directed in the opposite direction away from the first movable element and towards one of the openings of the fluid chamber. Thus, a fluid flow is generated and provided at the respective opening.

The controller controls a state of the first and second actuator, i.e., the controller causes the first and second movable elements of the first and second actuator, respectively, to perform a movement operation into and out of the fluid chamber. Preferably, the movement direction of the movement operation is oblique, especially perpendicular, with respect to the desired pumping direction of the fluid through the fluid chamber.

The controller is configured to drive the first and second actuator successively, so that first the first actuator is driven and moved to the extracted position and after that the second actuator is driven and moved to the extracted position while the first actuator is held in the extracted position at least until the second actuator has reached its extracted position. These steps may be referred to as one cycle of the fluid pump. One cycle of the pump produces one ejection of fluid from the fluid chamber. However, it is noted that the number of actuators is not limited to two. The fluid pump may comprise more than two actuators.

According to an embodiment, the first actuator is arranged between the first opening and the second actuator.

Thus, when the first actuator is driven so that the first movable element is moved from its initial or retracted position to an extracted position, the first movable element pushes part of the fluid within the fluid chamber towards the first opening and part of the fluid towards the second actuator, i.e., towards the second opening. As soon as the first movable element has reached its extracted position, the second movable element is moved from its retracted position to its extracted position. A majority of the fluid displacement caused by the movement of the second movable element can now only move towards the second opening.

In other words, the first actuator and the second actuator are longitudinally offset along a longitudinal direction of the fluid chamber between the first opening and the second opening, with the intended flow direction corresponding to the longitudinal direction.

According to a further embodiment, the second time t2 is after the first time t1.

As described above, first the first movable element is moved to its extracted position and after that, the second movable element is moved from its initial position to its extracted position.

According to a further embodiment, the controller is configured to control, at a third time t3, the first movable element to move from the at least partially extracted position towards the initial position, wherein the third time t3 is after the second time t2.

Accordingly, the first movable element is brought to its initial or retracted position, so that another cycle can start.

According to a further embodiment, the controller is configured to generate a first driving signal at a predetermined frequency and to supply the first driving signal to the first actuator, wherein the first driving signal defines a level of excitation of the first movable element between the initial position and the extracted position, wherein the controller is configured to generate a second driving signal at a predetermined frequency and to supply the second driving signal to the second actuator, wherein the second driving signal defines a level of excitation of the second movable element between the initial position and the extracted position. The second driving signal is phase shifted with respect to the first driving signal. Preferably, the first and second driving signals are sinusoidal-signals. More preferably, the first and second driving signals have the same predetermined frequency.

Thus, the movement distance of the first movable element and of the second movable element can be controlled by an amplitude of the respective driving signal. For example, the movement elements are extracted the more, the greater the amplitude of the driving signals is. The movement distance of the movable elements has an impact on the amount of pumped fluid.

The first driving signal and the second driving signal are phase shifted with respect to one another so that the movement pattern of the movable elements is produced as described above.

According to a further embodiment, the first actuator and the second actuator are loudspeakers and wherein the movable element of the first actuator and the second actuator is a membrane of the loudspeaker.

When a loudspeaker is driven by a signal waveform, its membrane oscillates and a fluid like a gas or a liquid that surrounds the membrane is caused to oscillate, too. A loudspeaker that is placed at a wall of a fluid chamber and facing towards the interior of the fluid chamber causes a fluid that is located within the fluid chamber to move sideward because the wall of the fluid chamber opposite to the loudspeaker redirects the movement direction of the fluid in a lateral direction.

In this embodiment, a fluid flow is generated by driving two loudspeakers with a corresponding driving signal, so that movement of the membrane of the loudspeakers generates the fluid flow.

According to a further embodiment, the first actuator and the second actuator are piezoelectric actuators and a surface thereof corresponds to the movable element that is moved when the controller supplies an electric signal to the respective piezoelectric actuator.

This embodiment is based on the same principle as the embodiment with the loudspeakers. However, instead of an oscillating membrane, a surface of a piezoelectric actuator oscillates and causes a movement of the fluid surrounding that surface of the piezoelectric actuator.

According to a further embodiment, the fluid chamber is a hollow space formed by a tube having a longitudinal direction that corresponds to the pumping direction, wherein the first opening is an inlet opening for the fluid to be pumped and is arranged at a first end of the tube, wherein the second opening is an outlet opening for the fluid to be pumped and is arranged at a second end of the tube opposite to the first end, and wherein the first and second actuators are arranged at the tube so that at least the first and second movable elements move at least partially within the hollow space defined by the tube when the movable elements move from the initial position to the extracted position or vice versa.

The cross section of the tube may be circular or rectangular. However, the cross section may be of any shape that is suitable to guide a fluid flow from the first opening to the second opening, or vice versa. Preferably, the tube is linear between the first opening at the second opening so that the fluid flow does not experience any flow resistance that could diminish the efficiency of the fluid pump.

According to a further embodiment, the first actuator and the second actuator are arranged at the same side of the fluid chamber side by side and next to each other. In this embodiment, the first actuator and the second actuator are preferably spaced apart from each other in a longitudinal direction of the fluid chamber.

In this embodiment, the first movement element of the first actuator moves from its retracted position to its extracted position when it moves towards the opposite side of the fluid chamber. This movement causes the fluid moving to the left and to the right with respect to the movement of the first movement element. In the next step, the second movement element of the second actuator moves from its retracted position to its extracted position and further pushes aside the fluid that has already been put into movement by the first actuator. The first actuator and the second actuator both face the opposite side or internal wall of the fluid chamber which redirects the fluid to the left and/or to the right.

According to a further embodiment, the first actuator is arranged at a first side of the fluid chamber and the second actuator is arranged at a second side of the fluid chamber, wherein the first actuator and the second actuator are arranged so that the first moving direction of the first movable element from the initial position to the extracted position intersects with the second moving direction of the second movable element from the initial position to the extracted position at an angle between 1° and 359°, preferably between 75° and 105°, or between 165° and 195°, or between 255° and 285°, more preferably at an angle of 90°, or 180°, or 270°, wherein the first actuator and the second actuator are offset with respect to each other in a longitudinal direction of the fluid chamber.

According to a further embodiment, the first actuator comprises two movable elements that are arranged opposite to each other without any longitudinal offset in a longitudinal direction of the fluid chamber, wherein the movable elements of the first actuator are controlled so that they move synchronously towards or away from each other when controlled by the controller.

In one embodiment described above, the first actuator includes only one movable element which moves towards and away from the opposite wall of the fluid chamber thereby causing a fluid flow perpendicular to the movement direction of the movable element. The present embodiment is directed to an actuator that comprises two movable elements arranged opposite to each other configured to move either towards each other or away from each other. Thereby, the change in volume or variation of the cross section of the fluid chamber at the position where the actuator is arranged is increased compared to the embodiment where the actuator comprises only one movable element. This may increase the amount of fluid delivery of the fluid pump. In this embodiment, the movable elements of one actuator are moving in opposite directions when the actuator is driven by a driving signal.

According to a further embodiment, the fluid pump comprises a multitude of actuators that are arranged along the longitudinal direction of the fluid chamber.

The process of pumping fluid is described above with reference to the first and second actuator and by describing a pumping cycle of the first and second actuators. This cycle can be extended by a third actuator or any number of actuators that are arranged side by side to each other along the longitudinal direction of the fluid chamber. For example, with a plurality of actuators, the pumping starts with the first actuator being driven so that its movable element moves from the refracted position to the extracted position. Then the second actuator is driven so that the movable element thereof moves to the extracted position while the first movable element is held in the extracted position. When the second movable element is in the extracted position, the first movable element can be retracted and at the same time the third movable element is driven to the extracted position. This process can be implemented with any number of actuators and causes a fluid flow from the first actuator towards the $n^{th}$ actuator.

According to a further embodiment, the fluid pump comprises two fluid chambers, each of which comprises at least two actuators, wherein the first opening of the first fluid chamber and the first opening of the second fluid chamber are fluidically connected with a common inlet opening and the second opening of the first fluid chamber and the second opening of the second fluid chamber are fluidically connected with a common outlet opening.

This embodiment enables connecting together two or more fluid pump elements so that a common fluid flow of all interconnected fluid pump elements is provided at the common outlet opening. Interconnecting a plurality of fluid pump elements may cause a constant fluid flow at the common outlet opening.

According to a further embodiment, the first actuator reduces the size of the cross section of the fluid chamber at the level of the first actuator when the first movable element moves from the initial position to the extracted position.

According to an aspect, the fluid pump as described herein is used to pump a gas from the first opening to the second opening.

DETAILED DESCRIPTION OF EMBODIMENTS

Figure 1:
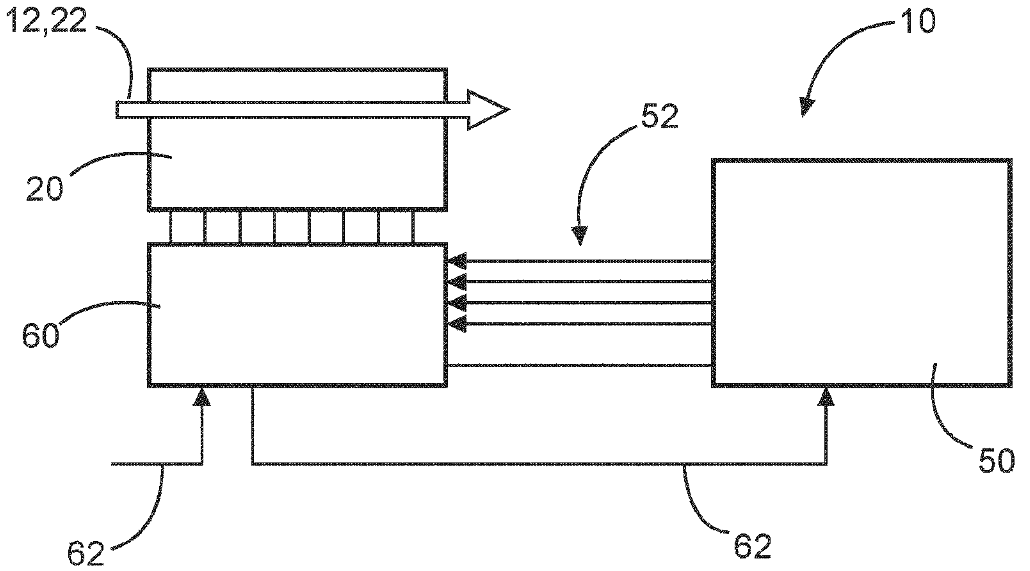
FIG. 1 shows a schematic overview of a fluid pump.

FIG. 1 shows a fluid pump 10. The fluid pump 10 comprises substantially three functional components: the first component corresponds to the fluid chamber 12 in connection with the actuators 20 that cause a fluid flow with a flow direction 22 through the fluid chamber, the second component is an amplifier 60 that provides energy to the actuators, and the third component is a controller 50 that controls the amplifier 60 to provide the required signaling and energy to the actuators 20.

For example, the actuator module 20 may consist of multiple audio speakers. Depending on the chosen signal pattern, that is transmitted by the controller 50 to the amplifier 60 via signal lines 52, the fluid to be pumped by the actuators through the fluid chamber 12 will flow into the desired direction 22.

The fluid pump 10 described herein can be used to pump any fluids like gases and also liquids and has a very robust design. It is instantly fully operational after activation and does not require any complex or long-lasting starting phase. The pump function itself will not jam or freeze-up and it is ideal for applications that require high reliability, especially when the pump has not been used for a long time period. The pump requires no or less maintenance and has no wear and tear. By choosing appropriate actuators for the desired use case, the pump may be very small in size, i.e., the physical dimension of the pump is down scalable or up scalable according to the use case or desired pump performance. The pump performance, e.g., gas volume over time, speed of the moving gas, can be freely controlled by the controller 50. The technique described herein may particularly be used to build very small pump systems for gas analysis applications. The pump may be operated completely silent when applying noise cancellations techniques. The direction of the gas flow can be controlled by applying corresponding signal patterns.

The fluid pump 10 may be used in the following target applications, but is not limited thereto: avionics, e.g. embedding the actuators in the wings to generate propulsion, chemistry, e.g. for analytical and production process control, for mixing small amounts of gases or liquids or taking very small samples in difficult to reach places, computer and electronics, e.g. for instant cooling with very low actuator profile, office and home applications, e.g. embedding air conditioning inside of furniture and where spaces are premium, 360° air distribution without additional mechanics and/or actuators (except for the actuators used for generating the fluid flow), space and defense, e.g. integrating ventilation in protective clothing like a space suit, cooling and fresh air supply in any type of protective clothing, semiconductor industry, e.g. wafer manufacturing process.

The fluid pump 10 described herein may be designed such that it generates a fluid flow in a single or omnidirectional orientation.

While the fluid pump 10 may be used to pump any fluid, i.e., gas or liquid, there may be some operational differences for gases and liquids. The operational frequency (in Hz) decides what substances can be processed (pumped) in the here described fluid pump. To move (pump) substances with a high density (like liquids or high viscosity substances) the operational frequency may be very low (in the area of 10 Hz to 0.01 Hz). To move (pump) substances with a low density (like gases) the operational frequency will be in the audio or in the ultra-sonic range.

The operational frequency may also vary depending on the physical length of the fluid chamber and the required speed with which the molecules (liquid or gas) have to leave the pump output.

Figure 2:
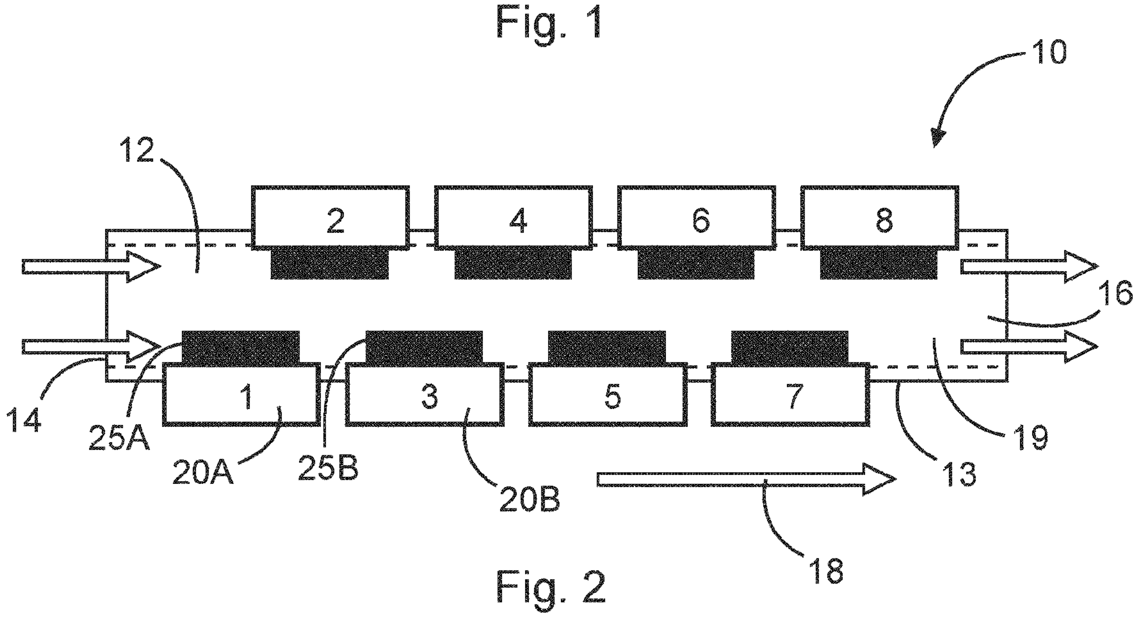
FIG. 2 shows a fluid pump with multiple actuators and a fluid chamber.

FIG. 2 shows a fluid pump 10 with a fluid chamber 12 that is surrounded by or defined by a wall 13. The fluid chamber 12 has a first opening 14 that is designed as a fluid inlet, and a second opening 16 that is designed as a fluid outlet. Multiple actuators 20 are arranged at the wall 13 of the fluid chamber 12 between the first opening and the second opening. Each actuator 20 comprises a movable element 25, exemplarily shown for two of the actuators: actuator 20A has the movable element 25A and actuator 25B has the movable element 25B. The actuators are numbered with numbers 1 to 8.

In the example of FIG. 2, eight actuators (e.g. loudspeakers) are arranged in two arrays of four actuators placed opposite to each other along the longitudinal direction of the fluid chamber, i.e., along the connection line between the first and second openings. The two arrays of actuators are not placed exactly opposite to each other but slightly shifted in relation to each other (by around halve of the width of an actuator). The actuators are numbered from 1 to 8.

The movable elements of the actuators 1 to 8 are shown in the same position which may be referred to as the initial position of the movable elements. Starting from this initial position, the movable elements may move up and/or down, i.e. towards or away from the actuators on the opposite side of the fluid chamber.

Figure 3:
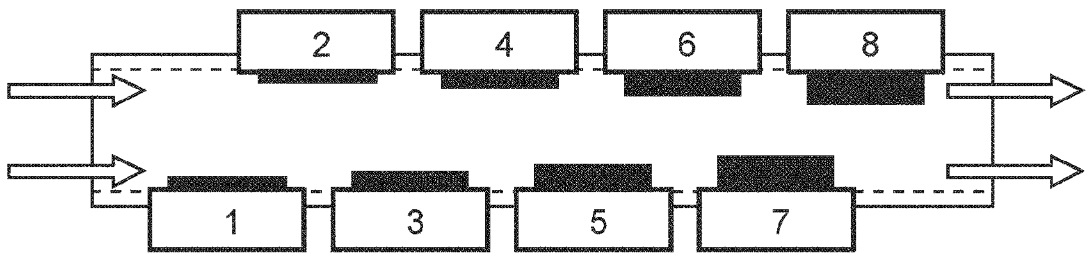
FIG. 3 shows the fluid pump of FIG. 2 with the actuators being in a different state.

FIG. 3 shows the fluid pump of FIG. 2, whereas only the actuators are indicated with their respective numbers 1 to 8. The actuators 1 and 2 are in the maximum retracted state, i.e., the movable elements are retracted so that the fluid volume between the movable elements of the actuators 1 and 2 is increased. In other words, fluid flows between the movable elements of actuators 1 and 2. Actuators 3 and 4 are also slightly retracted, i.e., the distance between the movable elements of actuators 3 and 4 is smaller than the distance between the movable elements of actuators 1 and 2. The distance between the movable elements of actuators 5 and 6 is even smaller and the movable elements of actuators 7 and 8 are maximum extracted and have the smallest distance from each other.

Figure 4:
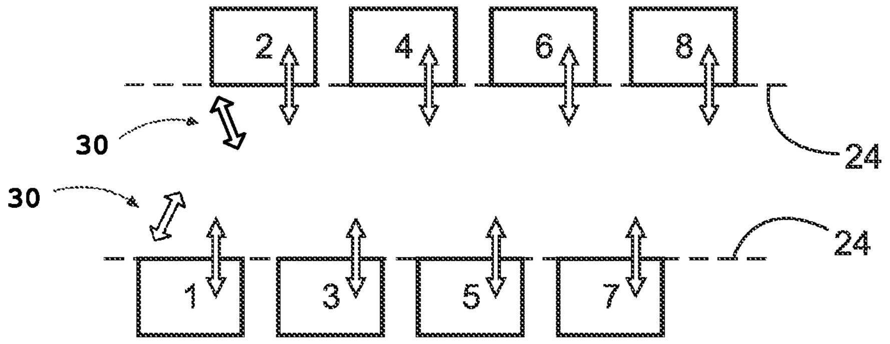
FIG. 4 shows a schematic movement scheme of the actuators of a fluid pump.

FIG. 4 shows a fluid pump with loudspeakers as actuators. When there is no signal applied to the speakers then the speaker's membranes are at the zero-position 24 (the membranes are not excited and are located at their initial position without any applied signal). The zero position 24 of the speakers is marked with a dashed line. When applying signals to the individual actuators (speakers) then the membranes will move in-and-out (as indicated by the vertical arrows).

However, the speakers may be inclined such that their respective moving directions indicated by arrows 30 are inclined with respect to each other and, consequently, the moving directions intersect each other without the membranes intersecting each other.

Figure 5:
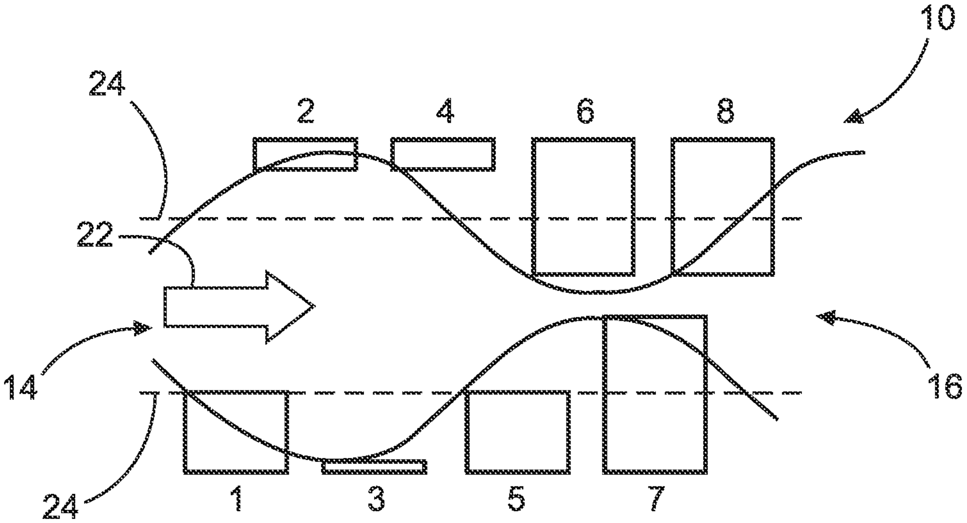
FIG. 5 shows a schematic movement of the fluid through a fluid chamber.
Figure 6:
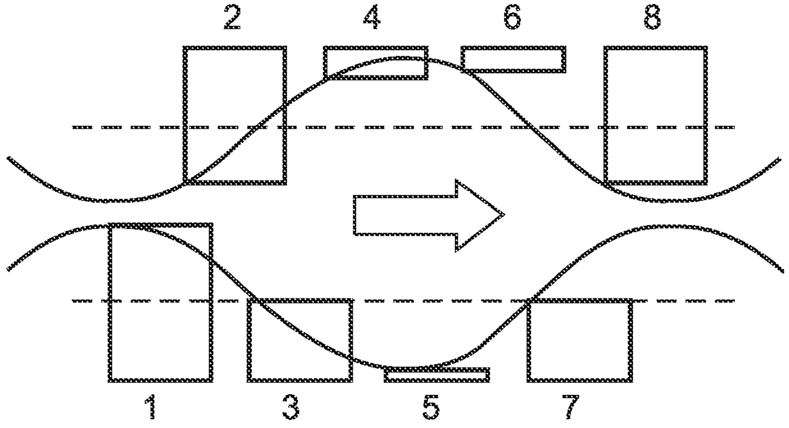
FIG. 6 shows a different state of the fluid pump of FIG. 5.
Figure 7:
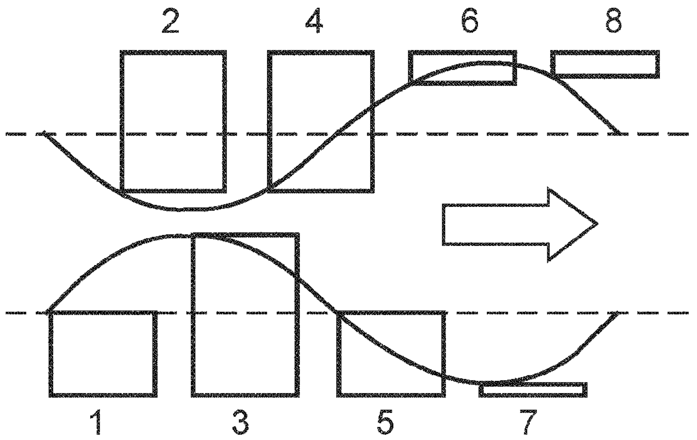
FIG. 7 shows a different state of the fluid pump of FIG. 5 and FIG. 6.

FIG. 5 to FIG. 7 show a pumping cycle of a fluid pump 10 having eight actuators 1 to 8

In FIG. 5, gas is sucked into the fluid chamber, the actuators 1, 2, 3, and 4 are in a retracted state, the fluid volume between the first opening 14 and the second opening 16 is indicated by two sinusoidal waveforms. The largest fluid volume is located between the movable elements of actuators 1 to 4 while the cross section of the fluid chamber towards the second opening is smaller, i.e., the actuators 5 to 8 are in an at least partially extracted state. In other words, the pump inlet is wide open while the pump output is closed or almost closed.

In FIG. 6, the fluid is moved through the pumping channel from the inlet towards the outlet as a result of the changed state of the actuators. The actuators 1 and 2 are commanded into the extracted state and their movable elements reduce the cross section therebetween while the cross section of the pumping channel between the actuators 5 and 6 as well as 7 and 8, respectively, is increased.

FIG. 7 shows the gas leaving the pumping channel. The gas is pushed out at the outlet because the actuators 7 and 8 are in their maximum retracted state and the actuators at the left thereof are moving to the extracted state, thereby pushing the gas out of the second opening.

Figure 8:
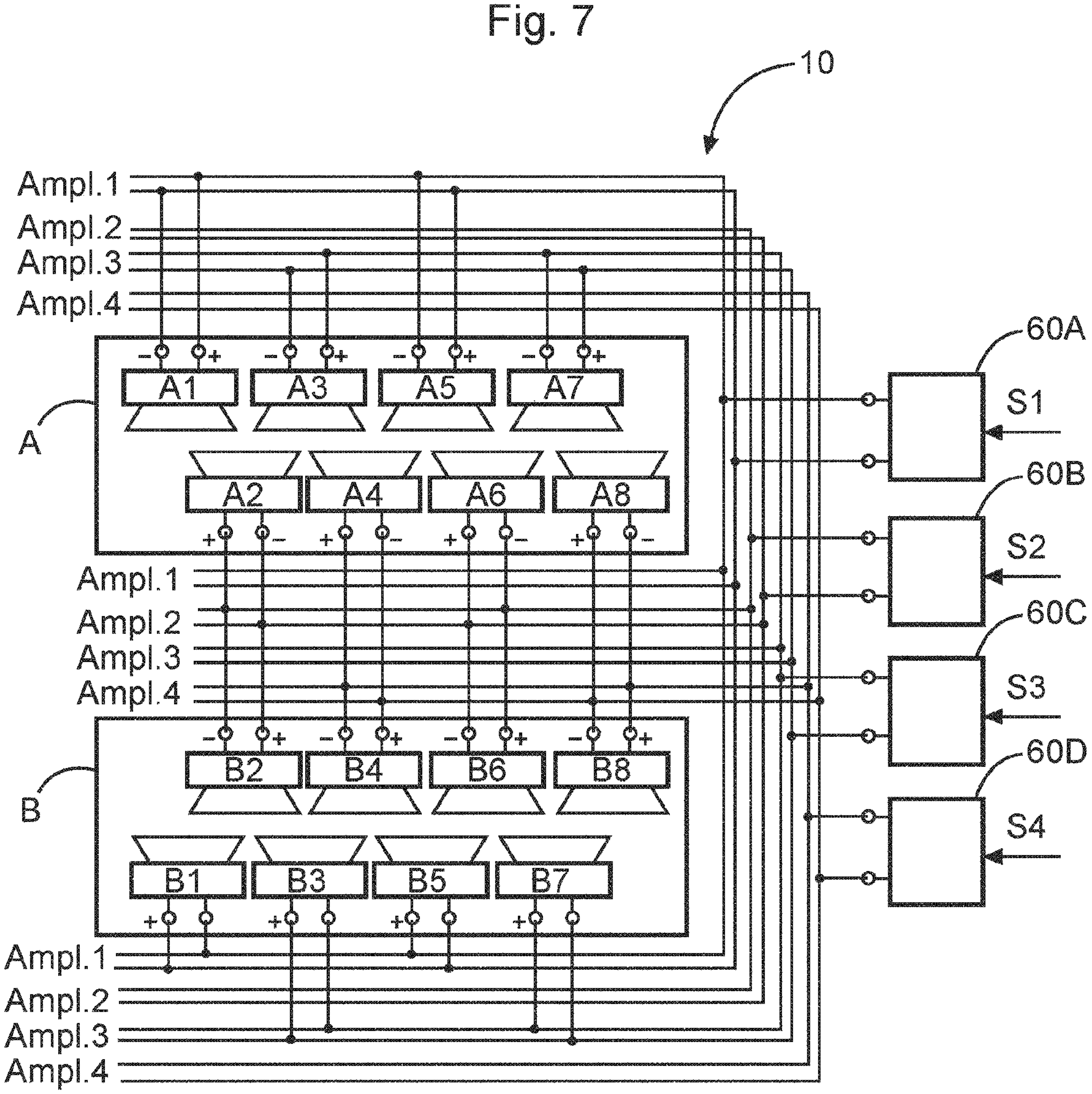
FIG. 8 shows fluid pump and the corresponding control signal lines.

FIG. 8 shows a fluid pump 10 with two channels A and B. The fluid pump 10 comprises four amplifiers 60A . . . 60D that are driven by signals S1 to S4, respectively. Each channel A and B comprises eight actuators A1 . . . A8, B1 . . . B8. The actuators of each of the channels A and B are arranged and configured similar to the single-channel fluid pump as shown in FIGS. 2 to 7.

The first amplifier, indicated at 60A, is driven by signal S1. The command signal generated by the first amplifier is set at a 0° phase and drives the actuators A1 and A5 of channel A and B1 and B5 of channel B. However, the actuators A1 and A5 are connected at different polarity to the supply lines of the first amplifier, so that there is a corresponding phase shift of 180° between actuator A1 and A5. The same applies to the actuators B1 and B5, which are also driven by the first amplifier 60A.

The second amplifier 60B is driven by signal S2 and generates command signals for actuators A2, A6 of channel A (again at different polarity) and B2, B6 of channel B (connected at different polarity). The signal of the second amplifier 60B is set at 45° with respect to the signal of the first amplifier.

The same principle applies to the third amplifier 60C and the fourth amplifier 60D. The signal S3 is set at 90° phase with respect to the signal of the first amplifier. The third amplifier drives the actuators A3, A7 and B3, B7. The signal S4 is set at 135° phase with respect to the signal of the first amplifier. The fourth amplifier drives the actuators A4, A8 and B4, B8.

It is furthermore noted that the actuators with the same number of the channels A and B are connected at different polarity. For example, when the actuator A1 is maximum extracted, the actuator B1 is maximum retracted, etc. Thus, the fluid pulses generated and emitted by the first channel A are 180-degree phase shifted in relation to the fluid pulses of the channel B. As the dual pumping channels are running in parallel and as the outputs are connected to each other, the audible signal will be canceled at the gas pump output.

Figure 9:
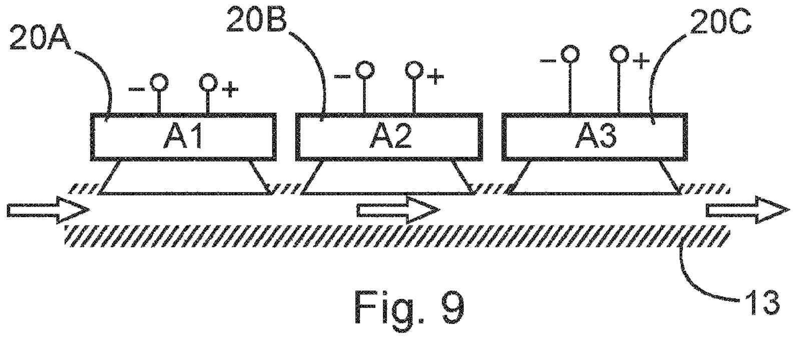
FIG. 9 shows a fluid pump with actuators arranged side by side in a row.

FIG. 9 shows a schematic representation of a fluid pump 10 with an actuator array with all actuators located at the same side of the fluid chamber and within the same side wall 13. In the present example, three actuators 20A, 20B, 20C, also indicated A1, A2, A3 are located side by side to each other at the upper wall of the fluid chamber and opposite to the lower wall 13 indicated with hatches.

The actuators 20A, 20B, 20C are driven to their retracted and extracted state as described above to generate a fluid flow from the inlet opening to the outlet opening. In this example, actuator 20A is first retracted to let in fluid. Then, actuator 20B is also retracted and actuator 20A is extracted to reduce the cross section in the backwards direction, i.e., the cross section between the second actuator 20B and the inlet opening. When the second actuator is driven to its extracted state, the fluid is pushed to the right, towards the outlet opening and the third actuator 20C. Now, the third actuator 20C can be driven to the extracted state and the first actuator 20A driven to the retracted state to start the cycle again.

Figure 10:
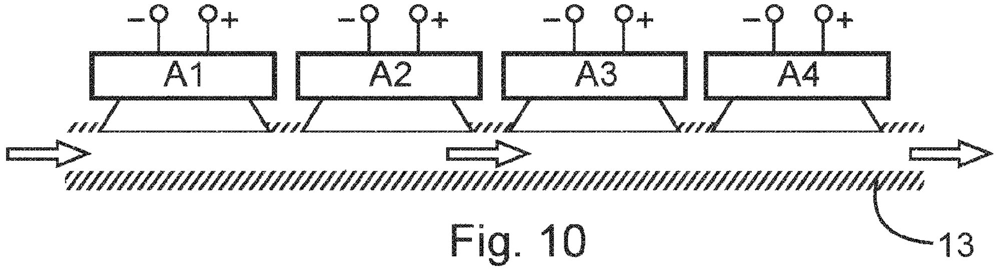
FIG. 10 shows a fluid pump with actuators arranged side by side in a row.

FIG. 10 shows an example that is similar to that of FIG. 9. However, the example fluid pump of FIG. 10 has four actuators that are placed side by side to each other and at the same side wall of the fluid chamber.

Figure 11:
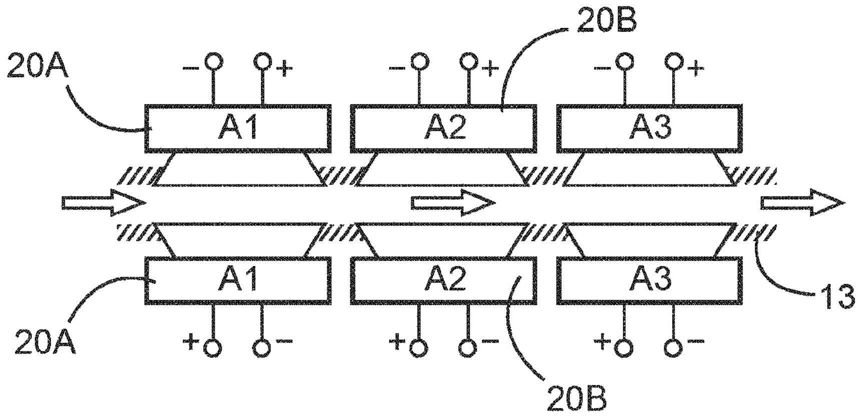
FIG. 11 shows a fluid pump with actuators each having two movable elements that are arranged opposite to each other.

FIG. 11 shows a fluid pump with two actuator arrays that are placed at one and the same fluid chamber at opposite side walls of the fluid chamber. The first actuator can be referred to as the two loudspeakers A1. In the example of FIG. 11, there is no lateral offset along the longitudinal direction between the loudspeakers A1. These loudspeakers are aligned with each other and they move synchronously, i.e., when the upper actuator A1 is retracted (moves upwards) then the lower actuator A1 is also retracted (moves downwards).

The control scheme of the fluid pump of FIG. 11 is same as described above with reference to FIG. 9. However, instead of driving only one actuator A1, A2, A3, as described with reference to FIG. 9, two actuators A1, A2, A3 are driven accordingly. The two actuators with the same labelling (like A1) are driven by the same signal. In one example, the phase shift between the actuator signals of the actuators A1, A2, A3 is 120 degrees.

The fluid pump of FIG. 11 may increase the amount of fluid pumped through the fluid chamber.

Figure 12:
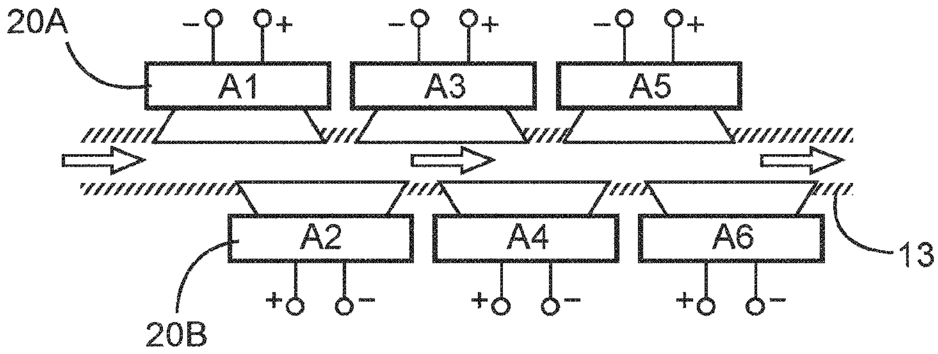
FIG. 12 shows a fluid pump with actuators arranged on different sides of the fluid chamber and having a longitudinal offset with respect to each other.

FIG. 12 shows an alternative fluid pump design where the actuators arranged on opposite side walls of the fluid chambers are laterally offset along the intended fluid flow direction (longitudinal direction of the fluid chamber, indicated by arrows from left to right). Of course, in this example each actuator is driven by its individual driving signal.

The pumping operation may be more smoothly when shifting the position of the second actuator array (actuators A2, A4, A6) in relation to the position of the first actuator array (A1, A3, A5).

However, this requires that each actuator will be driven by its own, phase shifted signal. In the example above, six different driver signals are required (to drive the actuators A1 to A6). The phase shift between each individual signal is 60 degrees.

Figure 13:
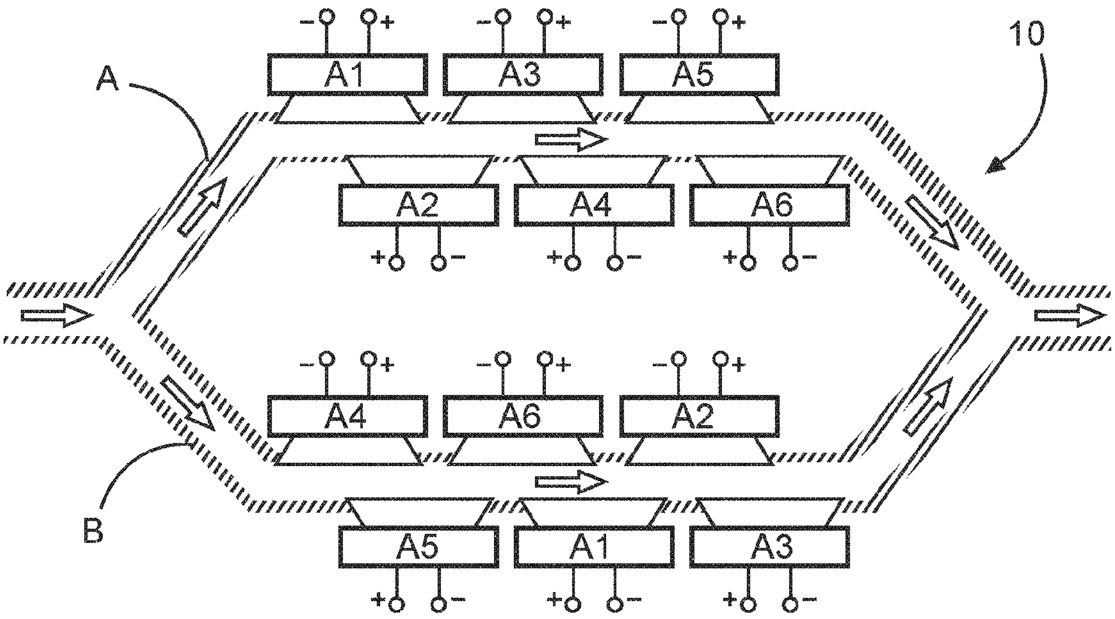
FIG. 13 shows a fluid pump with two fluid chambers connected to a common inlet and a common outlet.

FIG. 13 shows an overview of the structural design of a two-channel fluid pump 10. This structure corresponds to the functional design shown in FIG. 8.

Channels A and B are connected to a common inlet tube on the left and to a common outlet tube on the right. Depending on the phase of the driving signals for the actuators of the channels A and B, the fluid flow at the common outlet may be continuous without any significant pulsing.

To achieve a continuous and uninterrupted fluid flow the actuators of each channel A and B that are placed opposite to each other have to be connected to each other as shown above with reference to FIG. 8. In addition to a continuous fluid flow, the emitted audible noise will be greatly reduced and almost cancelled out.

Figure 14:
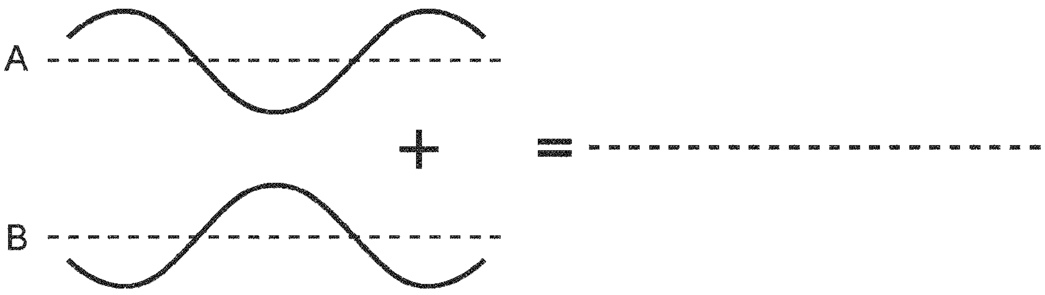
FIG. 14 schematically shows two superimposed fluid flows of the fluid pump of FIG. 13.

FIG. 14 shows the driver signals of channels A and B in audio range. When these signals superimpose, they cancel out each other and the resulting audio signal is almost zero.

Figure 15:
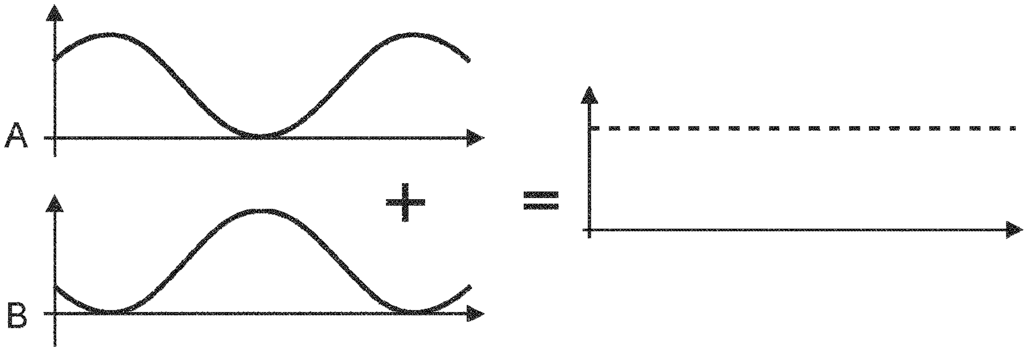
FIG. 15 schematically shows two superimposed fluid flows of the fluid pump of FIG. 13.

FIG. 15 shows the fluid flow inside the channels A and B. When channel A provides the maximum fluid output, channel B has its minimum fluid output, and vice versa. As a result, the fluid output at the common outlet of the two-channel fluid pump of FIG. 13 is constant, as shown on the right.

Figure 16:
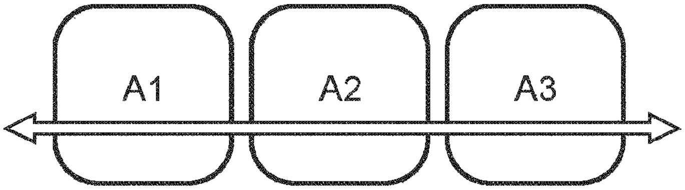
FIG. 16 schematically shows a fluid pump and the generated fluid flow.
Figure 17:
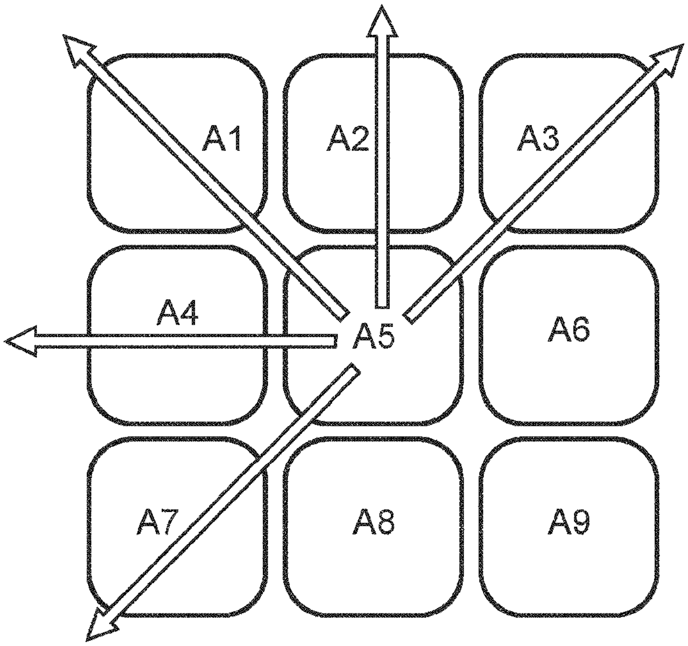
FIG. 17 schematically shows a fluid flow and multiple generated fluid flows.

FIG. 16 and FIG. 17 show different structural design principles of the fluid pump described herein.

FIG. 16 shows a single axis actuator array that allows to move fluid along a moving path defined by the structure of the fluid chamber. This is similar to the examples described in FIGS. 2 to 7 and 9 to 12 and also applies to each channel of the two-channel fluid pump shown in FIGS. 8 and 13. The fluid pump designed as shown in FIG. 16 allows to move fluid forward or backward in a single direction.

FIG. 17 shows a plurality of actuators A1 to A9 that are positioned to form a two-dimensional array of actuators. Any of these actuators has a movable element as described with reference to the other examples and these movable elements cause a fluid pulse cross to the moving direction of the movable element when the movable element moves towards another movable element or a wall that faces the moving movable element.

When using a two-dimensional array of actuators then the fluid flow can be directed 360 degrees around in any direction in the plane the actuators are placed. In which direction the fluid flow will be is decided by the signal pattern applied to the actuator array. This requires that each actuator will be driven by its own signal with the correct signal phase shift (positive phase shift or negative phase shift). When using a two-dimensional actuator array in an air-conditioning system, it allows to define exactly in which direction the conditioned air will be pumped (blown). There is no need for any additional fans/fins/actuators that would be needed to direct the airflow.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

LIST OF REFERENCE SIGNS

10 fluid pump, preferably for pumping gaseous fluids
12 fluid chamber
13 wall
14 first opening, inlet
16 second opening, outlet
flow direction, pumping direction, longitudinal direction
19 fluid channel
20 actuator, loudspeaker, piezoelectric element
22 flow direction
24 zero position of the movable element
25 movable element, membrane, piston, surface of piezoelectric element
50 controller, provides control signal to the actuator and/or to the amplifier
52 signal lines
60 amplifier, provides electric signal to the actuator based on control signal of controller
62 power supply

The invention claimed is:

1. A fluid pump for pumping fluids in a pumping direction, comprising:
- a fluid chamber which is at least partially enclosed by a wall with a first opening and a second opening;
- a first array of a plurality of actuators, the first array including a first actuator having a first movable element and being arranged at least partially within the fluid chamber between the first opening and the second opening;
- a second array of a plurality of actuators, the second array including a second actuator having a second movable element and being arranged at least partially within the fluid chamber between the first opening and the second opening; and
- a controller configured to control a state of the first actuator and the second actuator;
- wherein the first and second arrays are placed opposite of each other along a longitudinal direction of the fluid chamber and shifted relative to each other along the longitudinal direction of the fluid chamber such that the actuators of the first array are laterally offset relative to the actuators of the second array along the longitudinal direction of the fluid chamber by less than a width of one of the plurality of actuators in the longitudinal direction of the fluid chamber,
- wherein the first and second actuators are offset with respect to one another in a flow direction of the fluid from the first opening to the second opening,
- wherein the controller is configured to drive the first and second actuators so that a relative position of the respective movable element is determined,
- wherein the controller is configured to control, at a first time t1, the first movable element to move from an initial position to an at least partially extracted position towards the wall of the fluid chamber and thereby pushing aside the fluid within the fluid chamber, and
- wherein the controller is configured to control, at a second time t2, the second movable element to move from an initial position to an at least partially extracted position towards the wall of the fluid chamber and thereby pushing aside the fluid within the fluid chamber.

2. The fluid pump of claim 1, wherein the first actuator is arranged between the first opening and the second actuator.

3. The fluid pump of claim 1, wherein the second time t2 is after the first time t1.

4. The fluid pump of claim 1, wherein the controller is configured to control, at a third time t3, the first movable element to move from the at least partially extracted position towards the initial position and wherein the third time t3 is after the second time t2.

5. The fluid pump of claim 1, wherein the controller is configured to generate a first driving signal at a predetermined frequency and to supply the first driving signal to the first actuator, wherein the first driving signal defines a level of excitation of the first movable element between the initial position and the extracted position, wherein the controller is configured to generate a second driving signal at a predetermined frequency and to supply the second driving signal to the second actuator, wherein the second driving signal defines a level of excitation of the second movable element between the initial position and the extracted position, and wherein the second driving signal is phase shifted with respect to the first driving signal.

6. The fluid pump of claim 5, wherein the first and second driving signals are sinusoidal-signals.

7. The fluid pump of claim 5, wherein the first and second driving signals have the same predetermined frequency.

8. The fluid pump of claim 1, wherein the first and second actuators are loudspeakers and wherein the movable element of the first actuator and the second actuator is a membrane of the loudspeaker.

9. The fluid pump of claim 1, wherein the first and second actuators are piezoelectric actuators and a surface thereof corresponds to the movable element that is moved when the controller supplies an electric signal to the respective piezoelectric actuator.

10. The fluid pump of claim 1, wherein the fluid chamber is a hollow space formed by a tube having a longitudinal direction that corresponds to the pumping direction, wherein the first opening is an inlet opening for the fluid to be pumped and is arranged at a first end of the tube, wherein the second opening is an outlet opening for the fluid to be pumped and is arranged at a second end of the tube opposite to the first end, wherein the first and second actuators are arranged at the tube so that at least the first and second movable elements move at least partially within the hollow space defined by the tube when the movable elements move from the initial position to the extracted position or vice versa.

11. The fluid pump of claim 1, wherein the first and second actuators are arranged at the same side of the fluid chamber side by side and next to each other.

12. The fluid pump of claim 1, wherein the first and second actuators are spaced apart from each other in the longitudinal direction of the fluid chamber.

13. The fluid pump of claim 1, wherein the first actuator is arranged at a first side of the fluid chamber and the second actuator is arranged at a second side of the fluid chamber, wherein the first and second actuators are arranged so that a first moving direction of the first movable element from the initial position to the extracted position intersects with a second moving direction of the second movable element from the initial position to the extracted position at an angle between 1° and 359°, and wherein the first and second actuators are offset with respect to each other in the longitudinal direction of the fluid chamber.

14. The fluid pump of claim 13, wherein the angle is between 75° and 105°, between 165° and 195°, or between 255° and 285°.

15. The fluid pump of claim 13, wherein the angle is one of 90°, 180°, or 270°.

16. The fluid pump of claim 1, wherein the first actuator includes two movable elements that are arranged opposite to each other without any longitudinal offset in the longitudinal direction of the fluid chamber and wherein the movable elements of the first actuator are controlled so that they move synchronously towards or away from each other when controlled by the controller.

17. The fluid pump of claim 1, further comprising:

a plurality of actuators arranged along the longitudinal direction of the fluid chamber.

18. The fluid pump of claim 1, further comprising:

two fluid chambers, each of the two fluid chambers including at least two actuators, wherein the first openings of the two fluid chambers are fluidically connected with a common inlet opening and the second openings of the two fluid chambers are fluidically connected with a common outlet opening.

19. The fluid pump of claim 1, wherein the first actuator reduces a size of a cross section of the fluid chamber at a level of the first actuator when the first movable element moves from the initial position to the extracted position.

* * * * *